United States Patent
Embar et al.

(10) Patent No.: US 12,555,580 B2
(45) Date of Patent: Feb. 17, 2026

(54) AUTOMATIC EXTRACTION OF CONVERSATION HIGHLIGHTS

(71) Applicant: Cisco Technology, Inc., San Jose, CA (US)

(72) Inventors: Varsha Ravikumar Embar, Montreal (CA); Karthik Raghunathan, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 27 days.

(21) Appl. No.: 18/509,065

(22) Filed: Nov. 14, 2023

(65) Prior Publication Data

US 2024/0087573 A1    Mar. 14, 2024

Related U.S. Application Data

(63) Continuation of application No. 17/006,403, filed on Aug. 28, 2020, now Pat. No. 11,908,477.

(51) Int. Cl.

| G10L 15/26 | (2006.01) |
| G10L 15/02 | (2006.01) |
| G10L 15/06 | (2013.01) |
| G10L 15/22 | (2006.01) |
| G10L 15/32 | (2013.01) |

(52) U.S. Cl.
CPC .............. *G10L 15/26* (2013.01); *G10L 15/02* (2013.01); *G10L 15/063* (2013.01); *G10L 15/22* (2013.01); *G10L 15/32* (2013.01)

(58) Field of Classification Search
CPC ....... G10L 15/26; G10L 15/02; G10L 15/063; G10L 15/22; G10L 15/32; G10L 15/1822; G06F 40/169; G06F 40/205; G06F 40/30
See application file for complete search history.

(56) References Cited

U.S. PATENT DOCUMENTS

| 8,219,906 B2 * | 7/2012 | Arav ..................... G06F 40/134 |
| | | 715/261 |
| 8,832,584 B1 * | 9/2014 | Agarwal ............... G06F 3/0483 |
| | | 715/776 |
| 8,898,166 B1 * | 11/2014 | Navrides ............. G06F 16/9024 |
| | | 705/342 |
| 8,935,163 B2 * | 1/2015 | Huang ................... G10L 15/22 |
| | | 704/235 |

(Continued)

OTHER PUBLICATIONS

Office Action for U.S. Appl. No. 17/006,403, mailed Mar. 29, 2022, Raghunathan, "Automatic Extraction of Conversation Highlights", 9 pages.

(Continued)

*Primary Examiner* — Michael Colucci
(74) *Attorney, Agent, or Firm* — Lee & Hayes, P.C.

(57) ABSTRACT

This disclosure describes techniques for generating a conversation summary. The techniques may include processing at least one statement indication of the conversation to determine at least one statement that is a candidate highlight of the conversation. The techniques may further include applying linguistic filtering rules to the candidate highlight to determine the candidate highlight is an actual highlight. The techniques may further include generating the conversation summary including providing the actual highlight as at least a portion of the conversation summary.

20 Claims, 10 Drawing Sheets

(56) References Cited

U.S. PATENT DOCUMENTS

| | | | |
|---|---|---|---|
| 9,087,032 B1* | 7/2015 | Killalea | G06F 40/137 |
| 10,198,436 B1* | 2/2019 | Dockhorn | G06F 40/106 |
| 10,979,377 B1* | 4/2021 | Gupta | H04L 51/216 |
| 11,908,477 B2 | 2/2024 | Embar et al. | |
| 2004/0117740 A1* | 6/2004 | Chen | G06F 16/345 |
| | | | 715/210 |
| 2007/0041706 A1* | 2/2007 | Gunatilake | H04N 21/4345 |
| | | | 386/243 |
| 2007/0260564 A1* | 11/2007 | Peters | G06F 40/20 |
| | | | 707/E17.084 |
| 2009/0089417 A1* | 4/2009 | Giffin | H04L 51/212 |
| | | | 709/224 |
| 2011/0055228 A1* | 3/2011 | Tsuchida | G06F 40/242 |
| | | | 707/750 |
| 2011/0060587 A1* | 3/2011 | Phillips | G10L 15/30 |
| | | | 704/235 |
| 2014/0219434 A1 | 8/2014 | Youel et al. | |
| 2015/0088888 A1* | 3/2015 | Brennan | G06F 40/258 |
| | | | 707/737 |
| 2015/0149177 A1* | 5/2015 | Kalns | G10L 15/1822 |
| | | | 704/257 |
| 2017/0169816 A1 | 6/2017 | Blandin et al. | |
| 2017/0206191 A1* | 7/2017 | Biegert | G06F 40/30 |
| 2018/0122383 A1 | 5/2018 | Raanani et al. | |
| 2018/0174020 A1* | 6/2018 | Wu | G06N 3/044 |
| 2018/0189387 A1* | 7/2018 | Kim | G06F 40/30 |
| 2018/0285345 A1* | 10/2018 | Pradhan | G06F 40/30 |
| 2019/0087491 A1* | 3/2019 | Bax | G06Q 10/107 |
| 2019/0122766 A1* | 4/2019 | Strader | G16H 40/63 |
| 2019/0189117 A1 | 6/2019 | Kumar | |
| 2020/0185102 A1* | 6/2020 | Leventhal | G06F 40/117 |
| 2020/0394361 A1* | 12/2020 | Parikh | G06F 40/274 |
| 2021/0037353 A1* | 2/2021 | Locascio | G06Q 10/101 |
| 2021/0058263 A1* | 2/2021 | Fahrendorff | H04L 67/306 |
| 2021/0058264 A1* | 2/2021 | Fahrendorff | H04L 12/1822 |

OTHER PUBLICATIONS

Office Action for U.S. Appl. No. 17/006,403, mailed Aug. 5, 2022, Embar, "Automatic Extraction of Conversation Highlights", 17 pages.

Office Action for U.S. Appl. No. 17/006,403, mailed on Jan. 9, 2023, Varsha Ravikumar Embar, "Automatic Extraction of Conversation Highlights", 14 pages.

Office Action for U.S. Appl. No. 17/006,403, mailed on Apr. 28, 2023, Embar, "Automatic Extraction of Conversation Highlights",21 Pages.

Office Action for U.S. Appl. No. 17/006,403, mailed on Dec. 27, 2022, Varsha Ravikumar Embar, "Automatic Extraction of Conversation Highlights", 14 pages.

Riedhammer, Korbinian , et al Long Story Short—Global Unsupervised Models for Keyphrase Based Meeting Summarization; Published Jun. 2010, 15 pages.

* cited by examiner

| Action Name | Trigger Phrases |
|---|---|
| Remember | {"remember this", "remember that", "remind me", "remind us", "remind them"} |
| Action Item | {"action items", "next steps", "schedule", "due date", "share with", "share that", "schedule it", "follow up", "run it by", "I will share", "connect with", "look into", "I will ask", "check in with", "take it offline", "take that offline", "I will email"} |
| Summarize | {"just to summarize", "in summary", "I'll recap", "let's recap", "to recap"} |
| Clarify | {"if I heard correctly", "if I understand", "make sure I understand", "can you clarify?", "to clarify", "lets clarify"} |
| Decision | {"made a decision", "we decided", "decision is", "going to tell", "go ahead", "move forward", "I disagree", "I do not agree", "do not approve", "I agree"} |
| Notes | {"take a note", "capture that", "this is important", "that's very important", "this is critical", "critical path", "that is critical", "good point", "we are confident"} |

FIG. 3 let 's see what ⎡'s on the schedule for today⎤  402
VP PRP VB WP  ⎣VBZ IN DT    NN    IN  NN  ⎦    ✗

FIG. 4

⎡i will schedule a meeting with⎤ john tomorrow   502
⎣PRP MD  VB   DT  NN    IN  ⎦ NNP   NN      ✓

AUTOMATIC EXTRACTION OF CONVERSATION HIGHLIGHTS

RELATED APPLICATIONS

This patent application is a continuation of and claims priority to U.S. patent application Ser. No. 17/006,403, filed Aug. 28, 2020, which is fully incorporated herein by reference.

TECHNICAL FIELD

The present disclosure relates generally to extracting highlights from a conversation and, more specifically, to a method to automatically extract conversation highlights in an unsupervised manner.

BACKGROUND

Rising popularity of video conferencing software and advances in automatic speech recognition (ASR) make it possible to provide automatic meeting summarization tools. Unlike the general summarization tools, which may provide a "gist" or other general summary, meeting participants and non-participants may expect summaries to include highlights, such as action items, decisions and important announcements. Given the highly sensitive nature of some meetings, acquiring and annotating large amounts of data to train summarization models may be time consuming and costly. There may also be an amount of subjectivity in determining what each participant considers important depending on their role or project, which can lead to poor inter-annotator agreement. These challenges make a supervised learning approach less feasible in a real-world setting, as opposed to in an academic setting where a supervised learning approach is popular.

It may be desirable to provide techniques that generate accurate summaries of meetings and/or, more generally, of conversations, where the generation of a summary accounts for what may be the sensitive nature of the conversation. The conversations may be verbal, such as during meetings or, in some examples, may be written, such as by instant messaging.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 is a table that further illustrates how a phrase matcher may operate.

FIG. 4 illustrates an example of how a candidate filter may operate for one situation in which the word "schedule" is identified as a match by a phrase matcher.

FIG. 5 illustrates another example of how the candidate filter may operate for one situation in which the word "schedule" is identified as a match by a phrase matcher.

DESCRIPTION OF EXAMPLE EMBODIMENTS

Overview

Figure 1:
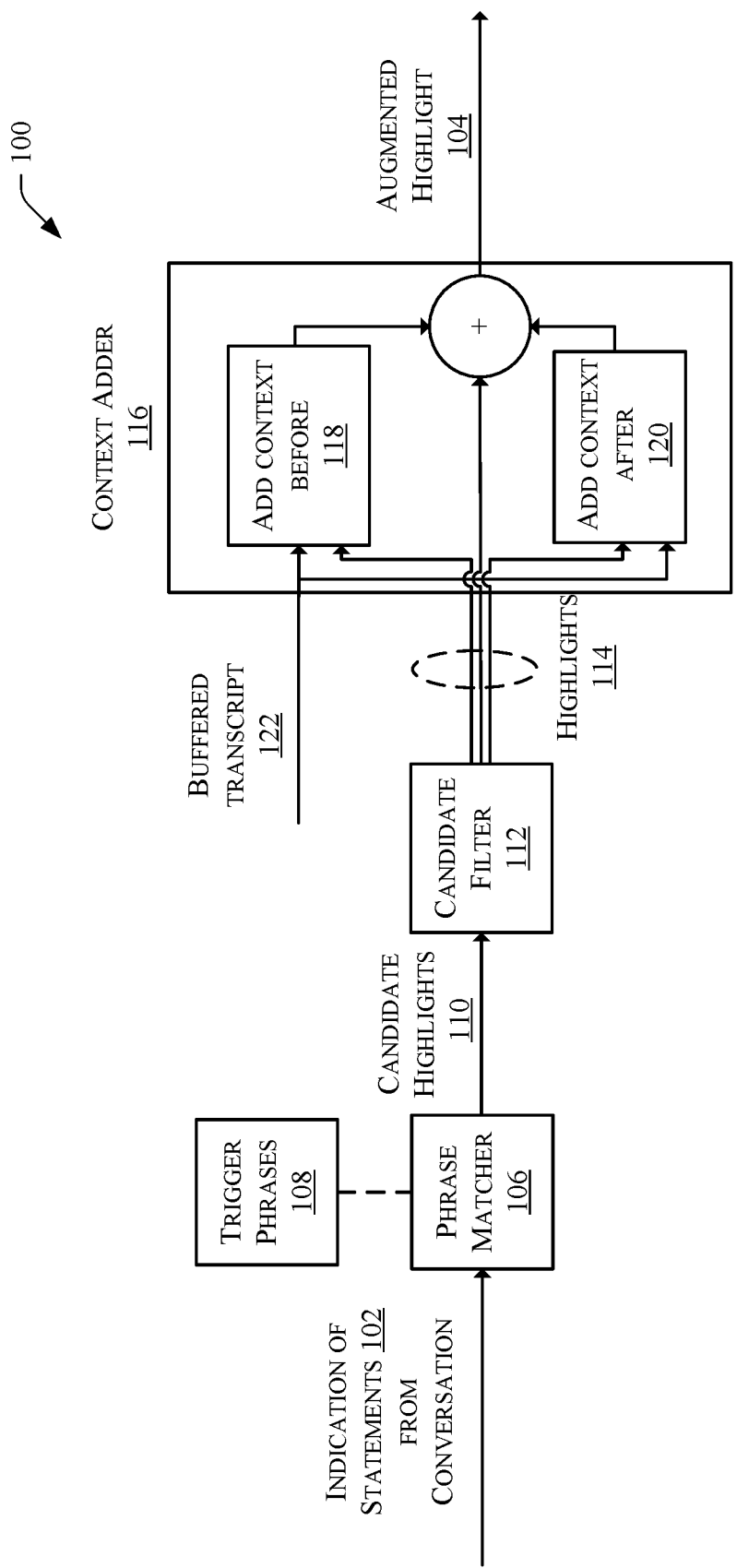
FIG. 1 is a diagram illustrating an architecture of an example system that receives an indication of statements, made during a conversation, as input and outputs an augmented highlight.

This disclosure describes techniques for generating a conversation summary. The techniques may include processing at least one statement indication of the conversation to determine at least one statement that is a candidate highlight of the conversation. The techniques may further include applying linguistic filtering rules to the candidate highlight to determine the candidate highlight is an actual highlight. The techniques may further include generating the conversation summary including providing the actual highlight as at least a portion of the conversation summary.

Additionally, the techniques described herein may be performed by a system and/or device having non-transitory computer-readable media storing computer-executable instructions that, when executed by one or more processors, performs the methods described herein.

Example Embodiments

It may be desirable to provide techniques that generate accurate conversation summaries that are useful to participants and non-participants, in a manner, such as in an unsupervised manner, that accounts for what may be the sensitive nature of the conversation content.

Some prior techniques for conversation summarization utilize an entire conversation transcript to generate a conversation summary, using techniques such as neural multi-sentence compression, relation extraction and learned templates Extractive summarization approaches, on the other hand, may use techniques such as Maximal Marginal Relevance (MMR), Latent Semantic Analysis (LSA), graph-based approaches or supervised approaches using syntactic and prosodic features. Some prior techniques look for speech acts, defining an annotation schema for decision dialog acts and training a model to identify phrases relevant for decision summarization. Furthermore, some prior techniques look for dialog act information to identify action items taken or assigned during a conversation, defining action specific dialogue acts to extract a task to be performed along with its owner and timeframe.

It may be advantageous to identify lexical cues in a conversation that encompass action items, decisions and commitments and/or other lexical cues. For example, techniques may identify lexical cues by, in an unsupervised manner, matching speech content of a conversation to a predetermined list of trigger phrases. The list may include general tags or domain-specific tags. Determining lexical cues in this manner may, however, be over-inclusive. That is, some or many of the determined lexical cues in a conversation may not correspond to conversation highlights such as action items, decisions and important announcements.

It may be advantageous to treat the identified lexical cues as candidate phrases for conversation highlights. Thus, for example, some techniques may employ candidate phrase filtering techniques, such as linguistic filters to the candidate phrases, to minimize false positives generated by the trigger list match. For example, techniques may identify part-of-speech tags for every token within the candidate phrase and optionally including a window of tokens around the candidate phrase. The techniques may apply linguistic filtering to the tokens, such as based on identified part-of-speech tags. In this way, the technique may eliminate some candidate phrases as highlights, such as if the identified part-of-speech tags for the tokens corresponding to the candidate phrase do not meet certain conditions. For example, the techniques may eliminate some candidate phrases as highlights if the identified part-of-speech tags for the tokens corresponding to the sentence including the candidate phrase do not meet certain conditions consistent with the candidate phrase corresponding to an actual conversation highlight. In some examples, the filtering rules are applied to an entire sentence including the candidate phrase.

Some example filtering techniques may eliminate a candidate phrase as an actual conversation highlight if the sentence including the candidate phrase does not meet any of the following conditions: 1) has a noun and a verb; 2) has a modal and a verb; or 3) has a modal and a past tense verb. In some examples, if the sentence including the candidate phrase contains five words or less, the candidate phrase is filtered out. For the remaining candidates, the parts of speech (POS) tags are determined for each word in the sentence including the candidate phrase and within a window starting three tokens before the candidate phrase and ending three tokens after the candidate phrase. The filtering looks for certain POS tags like proper nouns, present and/or continuous verbs, and modal verbs. Also, certain combination of these POS tags further strengthens the case for retaining a candidate phrase as an actual highlight. example of such a rule looks for the presence of a noun and a verb. If there is a past tense verb, then there is a check to determine if there is also a modal verb.

Conversation summarization techniques may include techniques to extract and analyze contents of a conversation either in real time or as a post-conversation step. Extracting and analyzing contents of a conversation in real time may provide more engagement with and satisfaction to users. For example, real time conversation summarization techniques may give the users more control over the summarization process, to edit or discard extracted items while the conversation content is fresh.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a diagram illustrating an architecture of an example system 100 that receives an indication of statements 102 from a conversation as input and outputs an augmented highlight 104. The indication of statements 102 may be a result of speech-to-text translation of speech within audio signals recorded during a conversation, such as during a meeting. For example, the system 100 may receive the indication of statements 102 substantially in real-time, as a meeting is occurring. In some examples, system 100 receives the indication of statements 102 in the form of a transcript that was generated while a meeting is occurring or after a meeting is occurring. The meeting may be, for example, an in-person meeting or an online video meeting, or some combination thereof. In other examples, the conversation may be in written form, such as via an instant messaging or similar type of conversation or via an email thread, for example.

Referring still to FIG. 1, a phrase matcher 106 matches phrases in the statements 102 to trigger phrases in a collection 108 of trigger phrases to determine candidate highlights 110. In some cases, a phrase may be only one word and in other cases, a phrase may be multiple words. For example, the phrase matcher 106 may compare the phrases contained in the statements 102 to the trigger phrases in the collection 108 of trigger phrases, to determine a candidate highlight 110. In some examples, the trigger phrases in the collection 108 of trigger phrases are manually curated generic phrases and may include phrases such as the following:

"I'll follow up";
"Send an email"; and
"remember to."
Additionally or alternatively, the trigger phrases in the collection 108 of trigger phrases may include domain-specific phrases. For example, the domain-specific phrases may relate specifically to the subject of a conversation from which the statements 102 originate. Examples of such domain-specific words and/or phrases may include the following:
"working on a fix";
"file a bug";
"open a PR."
In some examples, the collection 108 of trigger phrases includes about 225 trigger phrases. In other examples, the collection 108 of trigger phrases may include fewer or greater than 225 trigger phrases.

In some examples, the phrase matcher 106 may match phrases in the statements 102 to trigger phrases in a collection 108 of trigger phrases after lemmatizing the phrases in the statements 102 and/or lemmatizing the phrases in the collection 108 of trigger phrases. That is, the phrase matcher 106, in the process of matching phrases in the statements 102 to trigger phrases in the collection 108 of trigger phrases, may consider variant forms of the phrases in the statements 102 and variant forms of the phrases in the collection 108 of trigger phrases in determining the candidate highlights 110. Lemmatization includes determining the canonical form of a phrase based on its intended meaning, which may include correctly identifying the intended part of speech and meaning of a phrase in a sentence.

The phrase matcher 106 provides phrases that phrase matcher 106 determines match trigger phrases in the collection 108 of trigger phrases as candidate highlights 110 to a candidate filter 112. The candidate filter 112 processes the candidate highlights to filter out what, based at least in part on rules according to which the candidate filter 112 operates, are false positive candidate highlights. The candidate filter 112 may, for example, process a complete sentence in which a candidate highlight 110 appears in determining whether a candidate highlight is a false positive candidate highlight.

The rules according to which the candidate filter 112 operates may be, for example, linguistic filtering rules based on sentence structure. For example, the linguistic filtering rules may filter out candidate highlights that are a part of speech that would not be expected to be an actual highlight useful to conversation participants and non-participants. For example, a candidate highlight phrase may be "action items." The candidate filter 112 may identify the sentence in which the candidate highlight phrase occurs as "can we list out the action items before we end?" The candidate filter 112 may filter out this candidate highlight phrase if there is not, as in this example, a proper noun or verb associated with the "action items" candidate highlight phrase occurrence. This is just one example of filtering out a candidate highlight phrase using linguistic properties of how the candidate highlight phrase occurs.

The candidate filter 112 may apply some linguistic filtering rules universally to all candidate highlights 110 identified by the phrase matcher 106, whether, for example, resulting from a match to a generic trigger phrase in the collection 108 of trigger phrases or to a domain-specific trigger phrase in the collection 108 of trigger phrases. The candidate filter 112 may additionally or alternatively apply some linguistic filtering rules only to candidate highlights 110 identified by the phrase matcher 106 for specific trigger phrases in the collection 108 of trigger phrases.

Some categories of linguistic filtering rules include:
1) Semantic Parsing-Based, which are filtering rules that determine a semantic parse of a sentence contains a certain number and type of arguments, roles, etc. based on a machine-understandable representation of the meaning of the sentence.
2) Constituency Parsing-Based, which are filtering rules that determine a constituency-based parse tree for a sentence adheres to certain pre-defined templates and structures. Constituency parsing operates to extract a constituency-based parse tree from a sentence. The parse tree represents the syntactic structure of the sentence according to a phrase structure grammar.
3) Dependency Parsing-Based, which are filters that determine the dependency parse for the sentence contains certain expected relations and dependency types. Dependency parsing includes recognizing a sentence and assigning a syntactic structure to the sentence.
4) Part-of-Speech (POS) Tagging-Based, which are filters that determine words in a candidate sentence contain certain expected parts of speech. Part-of-Speech tagging includes breaking down a text into component parts of speech. The tagging includes determining an explanation of the form, function, and syntactic relationship of each part so that the meaning of the text can be understood.
5) Speech-Act tags, which are filters that determine a candidate sentence has a relevant speech act tag, such as commitments, directives, statements etc. A speech act tries to label a speaker's intentions or the action the speaker wishes to provoke from the listener. For example, the phrase "X needs to be done by Friday, can you do it please" is a directive speech act where the speaker issues a request to complete X and expects the listener to do it. Thus, for example, the phrase "X needs to be done by Friday, can you do it please?" may be considered a relevant speech act tag.
6) Miscellaneous: Other filters such as those based on the length of the sentence, the position of the sentence in the conversation, the confidence score of the automatic speech recognizer (ASR), etc.

Referring still to the example system 100, the candidate filter 112, after filtering out false positive candidate highlights 110, provides actual highlights 114 to a context adder 116. The context adder 116 may use a buffered transcript 122 of the conversation being analyzed to put an actual highlight 114 into context. That is, the context adder 116 adds a portion of the conversation prior to the actual highlight 114 and/or adds a portion of the conversation after the actual highlight 114 to generate the augmented highlight 104 to be, for example, displayed to a participant and/or non-participant in the conversation.

For example, an "add context before" function 118 and an "add context after" function 120 respectively add a portion of the conversation prior to the actual highlight 114 and a portion of the conversation after the actual highlight 114 to generate the augmented highlight 104. In one example, the context adder 116 operates similarly without regard for the content of the actual highlight 114. That is, the algorithm of the context adder 116 may operate the same for every highlight. In some examples, the operation of the context adder 116 differs depending on the content of the actual highlight 114. For example, the amount and manner of adding context to an actual highlight may be dependent on the content of the actual highlight.

In one example, an "add context before" function 118 and an "add context after" function 120 extract sentences, from the buffered transcript 122, before and after the sentence that includes the highlight 114 until reaching a sentence with ten tokens or more. A sentence in the buffered transcript 122 that has a large number of tokens, such as ten, may indicate a higher probability of a topic change in the conversation and so may be utilized as a cutoff point for augmenting an actual highlight 114 to generate the augmented highlight 104. In some examples, the "add context before" function 118 and the "add context after" function 120 operate more simply, to extract a fixed number of sentences (such as two) from the buffered transcript 122 before and after, respectively, the sentence in the buffered transcript 122 including the actual highlight.

Figure 2:
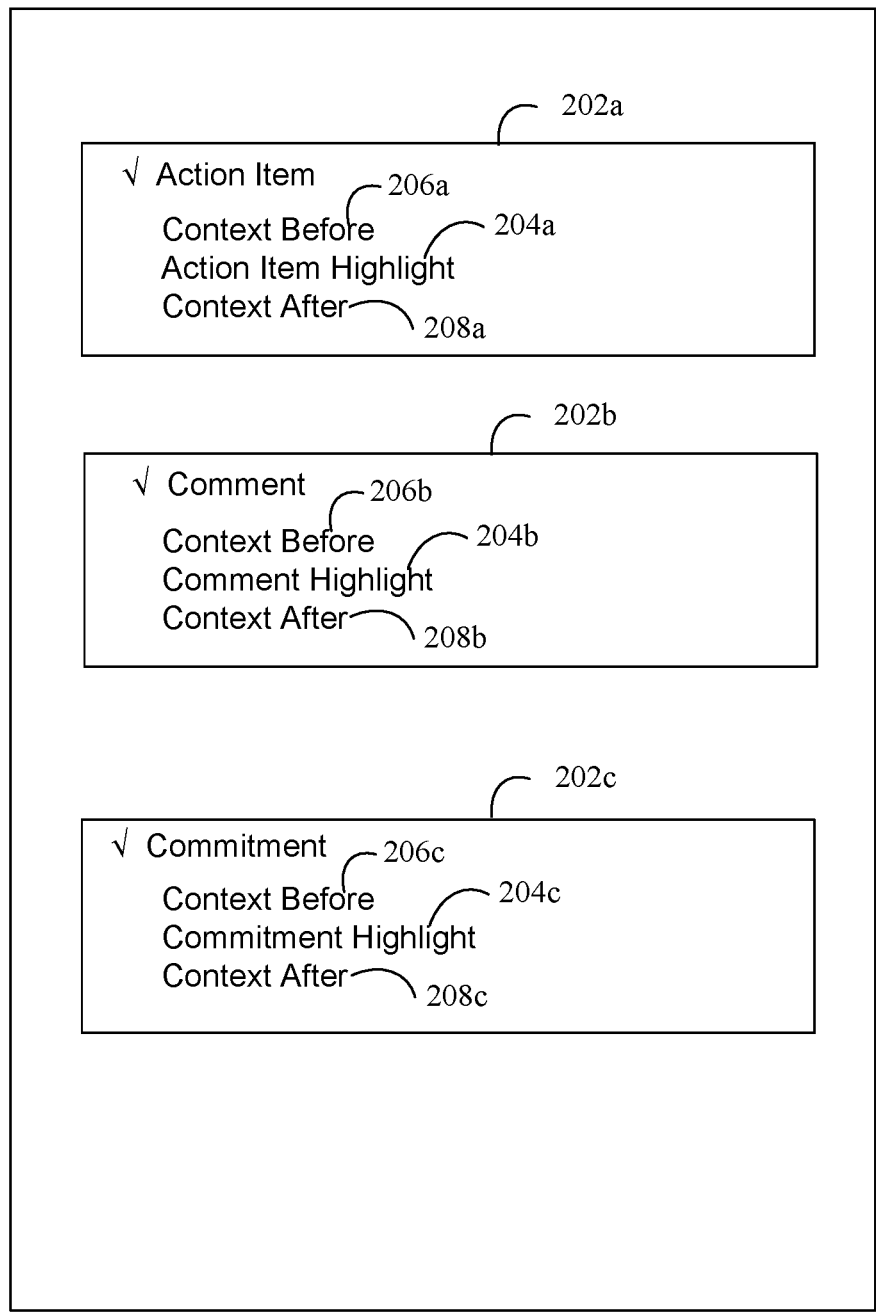
FIG. 2 graphically illustrates an example of a conversation minutes that may have been generated using techniques described herein.

FIG. 2 graphically illustrates an example of a conversation minutes 200 that may have been generated using techniques described herein. Each of the items 202a, 202b and 202c are augmented highlights 104. The conversation minutes 200 is an example, and many conversation minutes will have a far larger number of augmented highlights 104.

The item 202a includes an action item highlight 204a, augmented by context before 206a and context after 208a. For example, the action item highlight 204a may indicate some action that a meeting participant or non-participant is to take after a meeting. The item 202b includes a comment highlight 204b, augmented by context before 206b and context after 208b. For example, the comment highlight 204b may indicate a comment that a meeting participant or non-participant made during the meeting. The item 202c includes a commitment highlight 204c, augmented by context before 206c and context after 208c. For example, the commitment highlight 204c may indicate an obligation taken on by a meeting participant during the meeting.

The item 202a may have been generated, for example, by a phrase matcher 106 matching statements 102 of a conversation during a meeting to trigger phrases 108 to generate candidate highlights 110. A candidate filter 112 may have processed the candidate highlights 110 applying, for example, linguistic filtering rules, to filter out candidate highlight phrases using linguistic properties of how the candidate highlight phrases occur in the conversation being processed to determine an actual highlight 114. A context adder 116 may have added context before and/or after the actual highlight based at least in part on a buffered transcript 122. For example, an "add context before" function 118 and an "add context after" function 120 may have operated to detect a topic change before and/or after the actual highlight in the buffered transcript of may have operated to extract a fixed number of sentences before and/or after the sentence including the actual highlight. Based thereon, the context adder may have generated an augmented highlight 104 that is the item 202a in the conversation minutes 200.

The item 202b and the item 202c may have been similarly generated, by the phrase matcher 106, the candidate filter 112 and the context adder 116.

FIG. 3 illustrates a table 300 that further shows how the phrase matcher 106 may operate. The table 300 includes an "action name" column 302 and a "trigger phrases" column 304. An action name denotes an action corresponding to a candidate highlight. For example, the action name "remember" corresponds to a candidate highlight 110 that includes any of the phrases in the corresponding row of the "trigger phrases" column 304. Thus, for example, as the phrase matcher 106 processes statements 102, the phrase matcher 106 may be operating to identify candidate highlights 110 indicating a "remember" action. More specifically, in some examples, the phrase matcher 106 may be operating to identify candidate highlights 110 indicating a "remember" action by matching statements to the trigger phrases in the corresponding row of the "trigger phrases 304." For example, the phrase matcher may use a search algorithm such as a sequential search algorithm or an interval search algorithm to determine whether a statement 102, possibly as lemmatized, matches one of the phrases, possibly as lemmatized, in the "trigger phrases" column 304 of the table 300. If a match is found, the matched one of the phrases is treated as a candidate highlight of the type indicated by the name, in the "action name" column 302, that corresponds to the matched phrase. As discussed above, lemmatization includes determining the canonical form of a phrase based on its intended meaning, which may include correctly identifying the intended part of speech and meaning of a phrase in a sentence.

In the "trigger phrases" column 304, the table 300 includes trigger phrases for other action names besides the "remember" action name. The table 300 includes trigger phrases for action names including "action item," "summarize," "clarify," "decision" and "notes." These are just examples, and there may be more or fewer rows in the table 300.

As discussed, just matching statements 102 to trigger phrases 108 may lead to false positive highlights. For example, the phrase matcher 106 may recognize that the sentence "Let's see what's on the schedule for today" includes the word "schedule." The phrase matcher 106 may therefore determine that the sentence including the word "schedule" is a candidate highlight with an action name of "action item." However, in the context of this sentence, the word "schedule" does not actually signify an action item and, so, the sentence including the word "schedule" is a false positive candidate highlight.

The candidate filter 112 applies linguistic filtering rules to filter out false positive candidate highlights. For example, techniques may identify part-of-speech tags for every token within the candidate phrase and optionally including a window of tokens around the candidate phrase. The techniques may apply linguistic filtering to the tokens based on the identified part-of-speech tags, eliminating some candidate phrases as highlights if the identified part-of-speech tags for the tokens corresponding to the candidate phrase do not meet certain conditions.

In one example, given a window of text that starts three tokens before the matched trigger phrase to three tokens after the matched trigger phrase (unless earlier terminated by the start or end, respectively, of the sentence), the candidate filter annotates each token with its part of speech tag. For example, the following POS tags may be utilized:

| Part of Speech | POS tag | Description |
| --- | --- | --- |
| Noun | NN | Noun |
| | PRP | Personal Pronoun |
| | NNP | Proper Noun, |
| | NNP | singular Proper |
| | S | Noun, plural |
| Verb, Past | VBD | Verb, past tense |
| | VBN | Verb, past participle |
| Verb | VB | Verb, base form |
| | VB | Verb, non-3rd person singular |
| | P | present Verb, gerund or present |
| Modal | MD | Modal |

A candidate highlight 110 may be provided as an actual highlight 114 if the candidate highlight 110, plus the three tokens before and the three tokens after, collectively satisfies the following conditions:

1) has a noun and a verb;
2) has a modal and a verb; or
3) has a modal and a past tense verb.

FIG. 4 and FIG. 5 illustrate examples of how the candidate filter 112 may operate for two different situations in which the word "schedule" is identified as a match by the phrase matcher 106. As discussed below, in the FIG. 4 example, the sentence including the word "schedule" does not meet the conditions of being an actual highlight 114 and, so, is not provided as an actual highlight 114. In the FIG. 5 example, the sentence including the word "schedule" does meet the conditions of being an actual highlight 114 and, so, is provided as an actual highlight.

Referring to FIG. 4, three tokens before the word "schedule" to three tokens after starts with the "apostrophe s" and ends at the word "today," as shown by the box 402. The box 402 does not include three tokens after the word "schedule" because the sentence ends at the second token after the word "schedule." The tokens in the box 402 do not collectively meet any of the conditions listed above and, so, the sentence containing the word "schedule" in the FIG. 4 example is not provided as an actual highlight 114.

Referring to FIG. 5, three tokens before the word "schedule" to three tokens after starts with "i" and ends with "with," as shown by the box 502. The box 502 does not include three tokens before the word "schedule" because the sentence begins at the word "i." The tokens in the box 502 meet at least one condition and, so, the sentence including the word "schedule" in the FIG. 5 example is provided as an actual highlight 114. Specifically, the tokens in the box 502 meet both condition 1 (has a noun and a verb) and condition 2 (has a modal and a verb).

Figure 6:
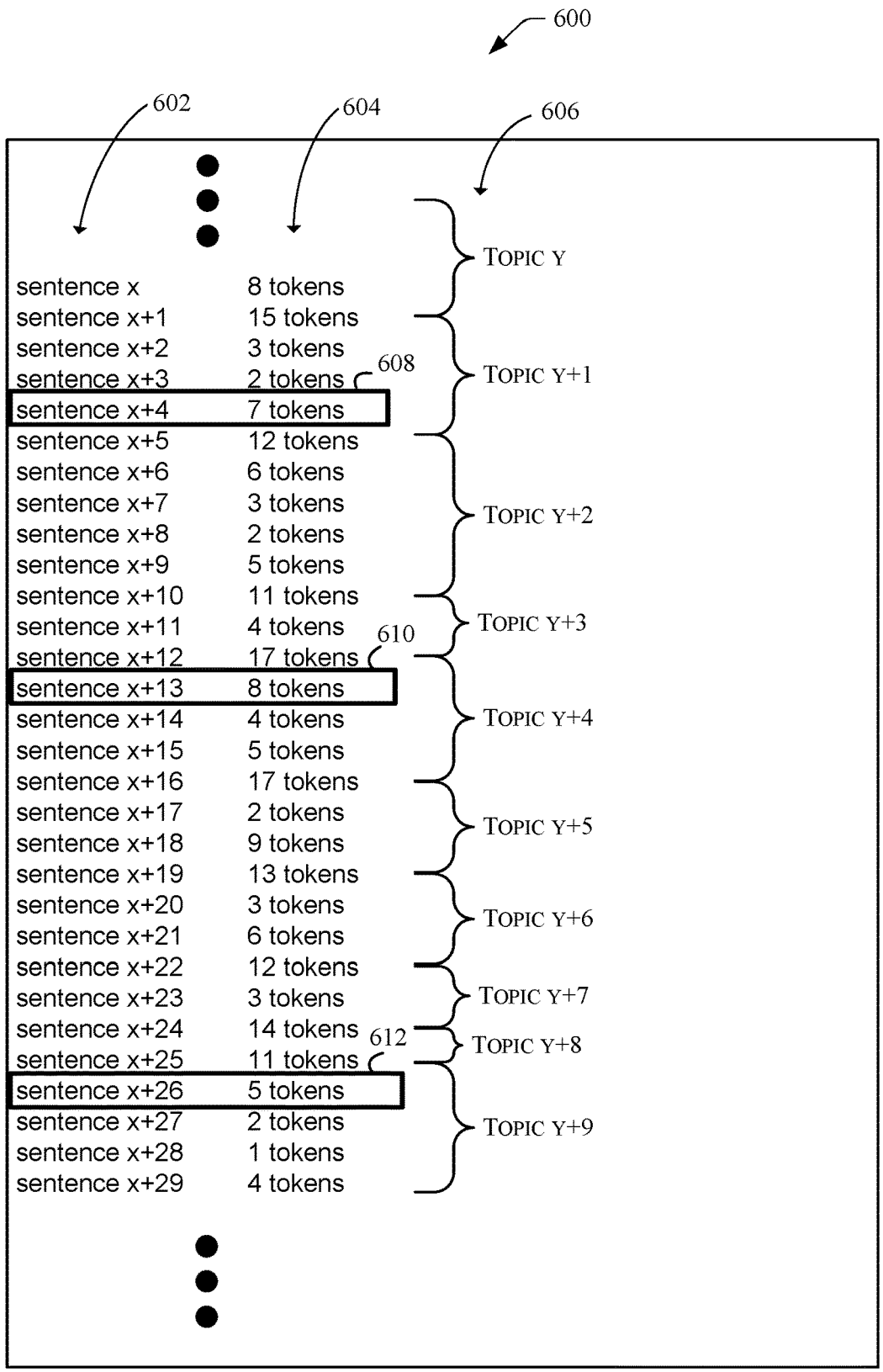
FIG. 6 shows a portion of an example conversation and illustrates an example of how a context adder may operate.

FIG. 6 shows a portion 600 of an example conversation and illustrates an example of how the context adder 116 may operate. Referring to FIG. 6, the portion 600 of the example conversation includes a plurality of sentences 602. The sentences 602 include Sentence x, Sentence x+1, Sentence x+2 and so on to Sentence x+29. The transcript may include sentences before Sentence x and may include sentences after Sentence x+29. The portion 600 may be a transcript in some examples. In other examples, a record of the portion 600 of the example conversation may not be in textual form. The portion 600 may be a portion of the buffered transcript 122 utilized by the FIG. 1 example system 100.

Referring still to FIG. 6, it is shown that each sentence 602 in the conversation portion 600 is characterized by a number of tokens 604. The number of tokens 604 may be determined by processing as the conversation is occurring, in near real time, and may be provided to the context adder 116 as part of the buffered transcript. For example, the processing may include tokenization functionality provided by Python or another programming language. In some examples, the context adder 116 includes the functionality to determine the number of tokens 604 characterizing each sentence of the conversation portion 600.

In one example, the sentences 602 between and including sentences with at least a predetermined number of tokens 604 are considered to comprise a topic 606. For example, still referring to FIG. 6, the sentences x+1, x+2, x+3 and x+4 are considered to comprise Topic y+1. As another example, the sentences x+12, x+13, x+14, x+15 and x+16 are considered to comprise Topic y+4. As still another example, the sentences x+25, x+26, x+27, x+28 and x+29 are considered to comprise Topic y+9.

The individual sentence 608, the individual sentence 610 and the individual sentence 612 are sentences 602 that have been identified as highlights 114. The "add context before" function 118 of the context adder 116 may add appropriate context before and the "add context after" function 120 of the context adder 116 may add appropriate context after one of the individual sentence 608, the individual sentence 610 and the individual sentence 612 to form an augmented highlight 104.

Taking the individual sentence 608 as an example, which is sentence x+4, the "add context before" function 118 of the context adder 116 may add sentences x+1, x+2, x+3 in forming an augmented highlight 104 including sentence x+4. Sentences x+1, x+2, x+3 are all considered to be part of Topic y+1, the same topic of which individual sentence 608 is considered to be part. Similarly, the "add context after" function 120 of the context adder may add sentence x+5 in forming the augmented highlight 104 including sentence x+4, since sentence x+5 is also considered to be part of Topic y+1.

Taking the individual sentence 610 as another example, which is sentence x+13, the "add context before" function 118 of the context adder 116 may add sentence x+12 in forming an augmented highlight 104 including sentence x+13. Sentence x+12 is considered to be part of Topic y+4, the same topic of which individual sentence 610 is considered to be part. Similarly, the "add context after" function 120 of the context adder may add sentences x+14, x+15 and x+16 in forming the augmented highlight 104 including sentence x+13, since sentences x+14, x+15 and x+16 are also considered to be part of Topic y+4.

Taking the individual sentence 612 as yet another example, which is sentence x+26, the "add context before" function 118 of the context adder 116 may add sentence x+25 in forming an augmented highlight 104 including sentence x+26. Sentence x+25 is considered to be part of Topic y+9, the same topic of which individual sentence 612 is considered to be part. Similarly, the "add context after" function 120 of the context adder may add sentences x+27, x+28 and x+29 in forming the augmented highlight 104 including sentence x+26, since sentences x+27, x+28 and x+29 are also considered to be part of Topic y+9.

Figure 7:
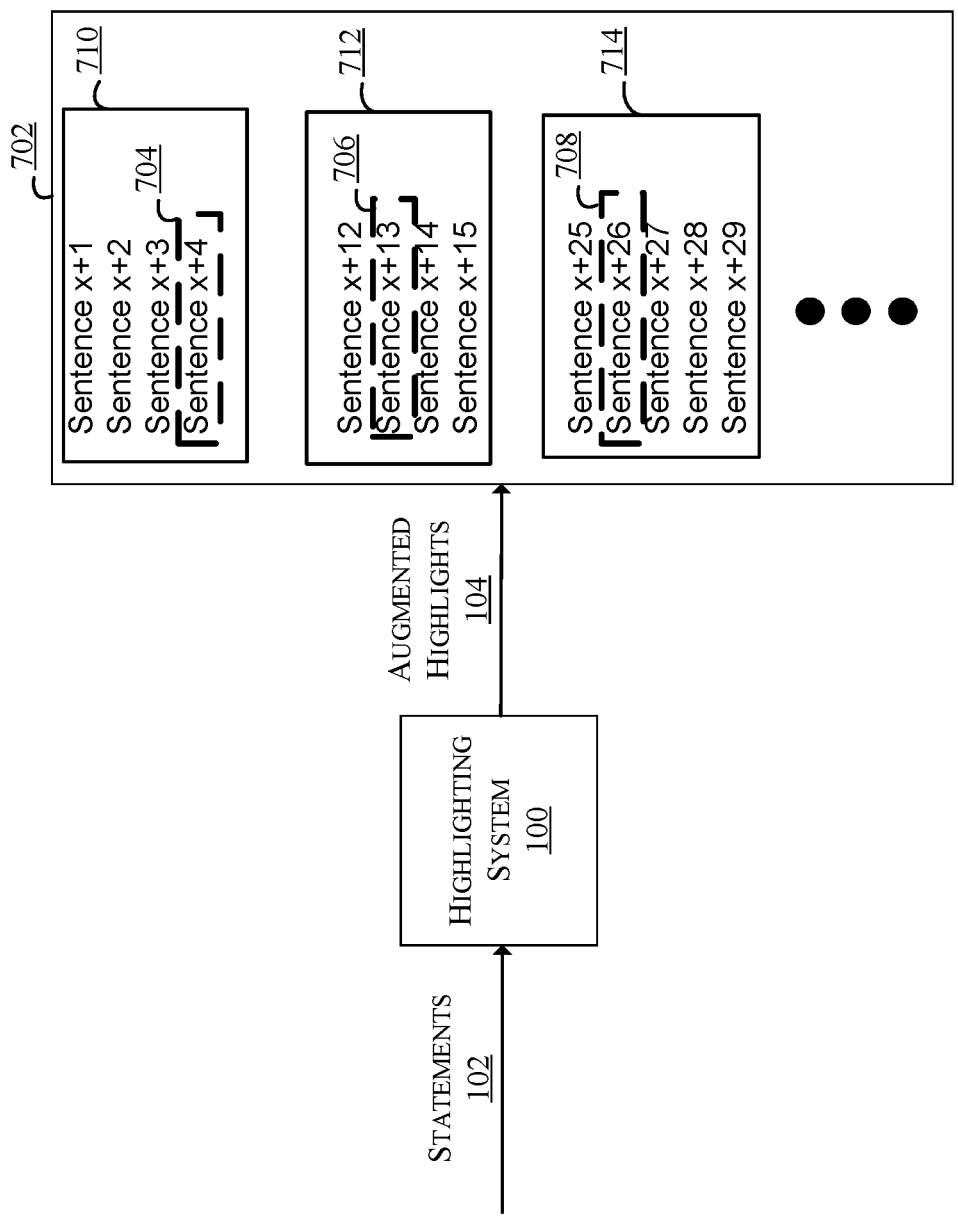
FIG. 7 shows an example conversation minutes that may be formed based on augmented highlights that a highlighting system outputs based on statements.

FIG. 7 shows an example conversation minutes 702 that may be formed based on the augmented highlights 104 that the highlighting system 100 outputs based on the statements 102. One or more processors of a computing device may cause portions of the conversation minutes to be displayed, for example, in substantially real time, to display portions of devices utilized by participants in the conversation and/or to non-participants in the conversation, as the conversation is occurring. As discussed above, a phrase matcher 106 of the highlighting system 100 may match statements 102 to trigger phrases 108 to generate candidate highlights 110. A candidate filter 112 may filter false positive ones of the candidate highlights 110 and provide actual highlights 114 to a context adder 116. The context adder 116, using a buffered transcript 122, may add context before and/or add context after the actual highlights 114 to generate augmented highlights 104.

Referring still to FIG. 7, the conversation minutes 702 includes the sentence 704, the sentence 706 and the sentence 708. The sentence 704, the sentence 706 and the sentence 708 correspond to actual highlights 114. The sentence 704 is presented on the conversation minutes 702 as part of an augmented highlight 710 including sentences surrounding the sentence 704; the sentence 706 is presented on the conversation minutes 702 as part of an augmented highlight 712 including sentences surrounding the sentence 706; and the sentence 708 is presented on the conversation minutes 702 as part of an augmented highlight 714 including sentences surrounding the sentence 708. For example, a context adder 116 of the highlighting system 100 may form the augmented highlight 710, the augmented highlight 712 and the augmented highlight 714.

Figure 8:
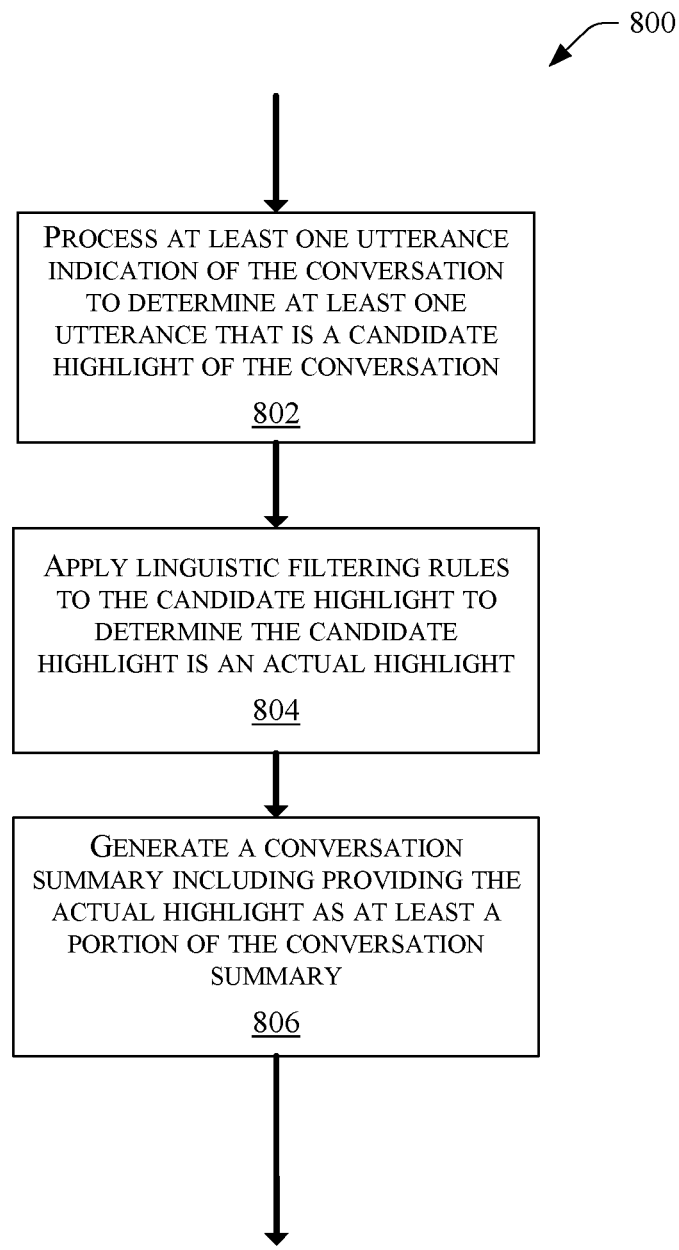
FIG. 8 is a flowchart illustrating a process that may be utilized to generate a conversation summary.

FIG. 8 is a flowchart illustrating a process 800 that may be utilized to generate a conversation summary such as the conversation minutes 702. The conversation being summarized may be, for example, a spoken conversation during an online meeting. As another example, the conversation may be written, such as an online instant messaging or other collaborative conversation. In some examples, the conversation is a combination of spoken conversation and written conversation.

At 802, one or more processors process at least one statement indication of the conversation to determine at least one statement that is a candidate highlight of the conversation. For example, the one or more processors may match phrases in statements 102 to trigger phrases 108 in a collection of trigger phrases, to determine candidate highlights 110. At 804, the one or more processors apply linguistic filtering rules to the candidate highlight to determine the candidate highlight is an actual highlight. For example, the candidate filter 112 may apply the linguistic filtering rules and provide actual highlights 114. At 806 the one or more processors generate a conversation summary, including providing the actual highlight as at least a portion of the conversation summary. In some examples, the conversation summary includes an augmented actual highlight, where the actual highlight is provided in the conversation summary with an additional portion of the conversation providing context. For example, a context adder 116 may process the actual highlight 114 and a buffered transcript 122 to generate the augmented highlight 104.

Figure 9:
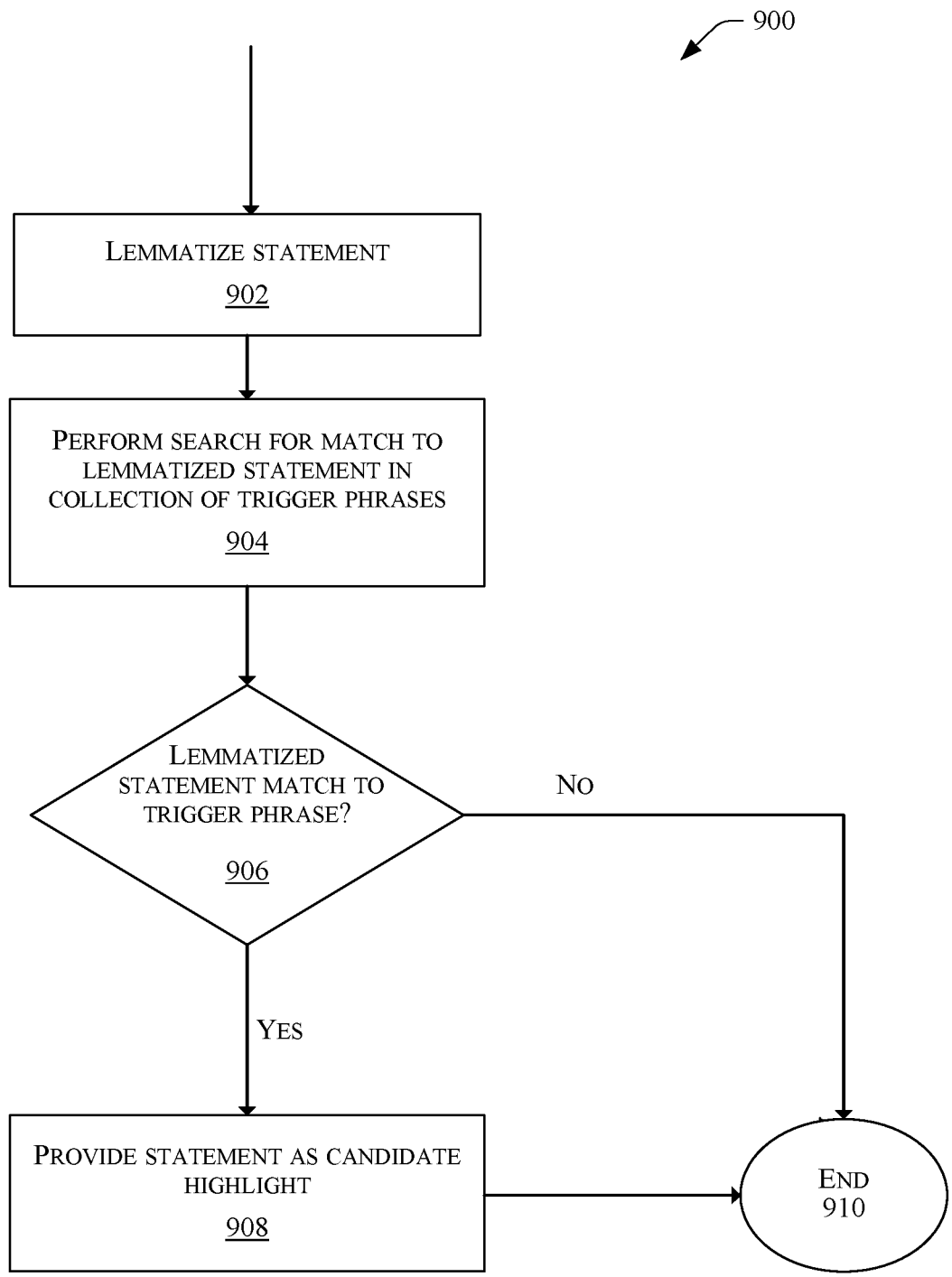
FIG. 9 is a flowchart illustrating a process that may be utilized to identify candidate highlights in a conversation.

FIG. 9 is a flowchart illustrating a process 900 that may be utilized to identify candidate highlights in a conversation. At 902, the one or more processors lemmatize a statement. At 904, the one or more processors search for a match to the lemmatized statement in a collection of trigger phrases. For example, the one or more processors may perform the search in an unsupervised manner to match the lemmatized statement to trigger phrases 108 in a collection of trigger phrases. In the process of matching phrases in the statements to trigger phrases in the collection of trigger phrases, the one or more processors may consider variant forms of the phrases in the statements and of the trigger phrases to determine the candidate highlights. As discussed above, lemmatization may include determining the canonical form of a phrase based on its intended meaning, which may include correctly identifying the intended part of speech and meaning of a phrase in a sentence. At 906, the one or more processors determine if the lemmatized statement matches to a trigger phrase, as lemmatized. If yes, at 908, the one or more processors provide the lemmatized statement as a candidate highlight. Otherwise, at 910, the process 900 ends.

Figure 10:
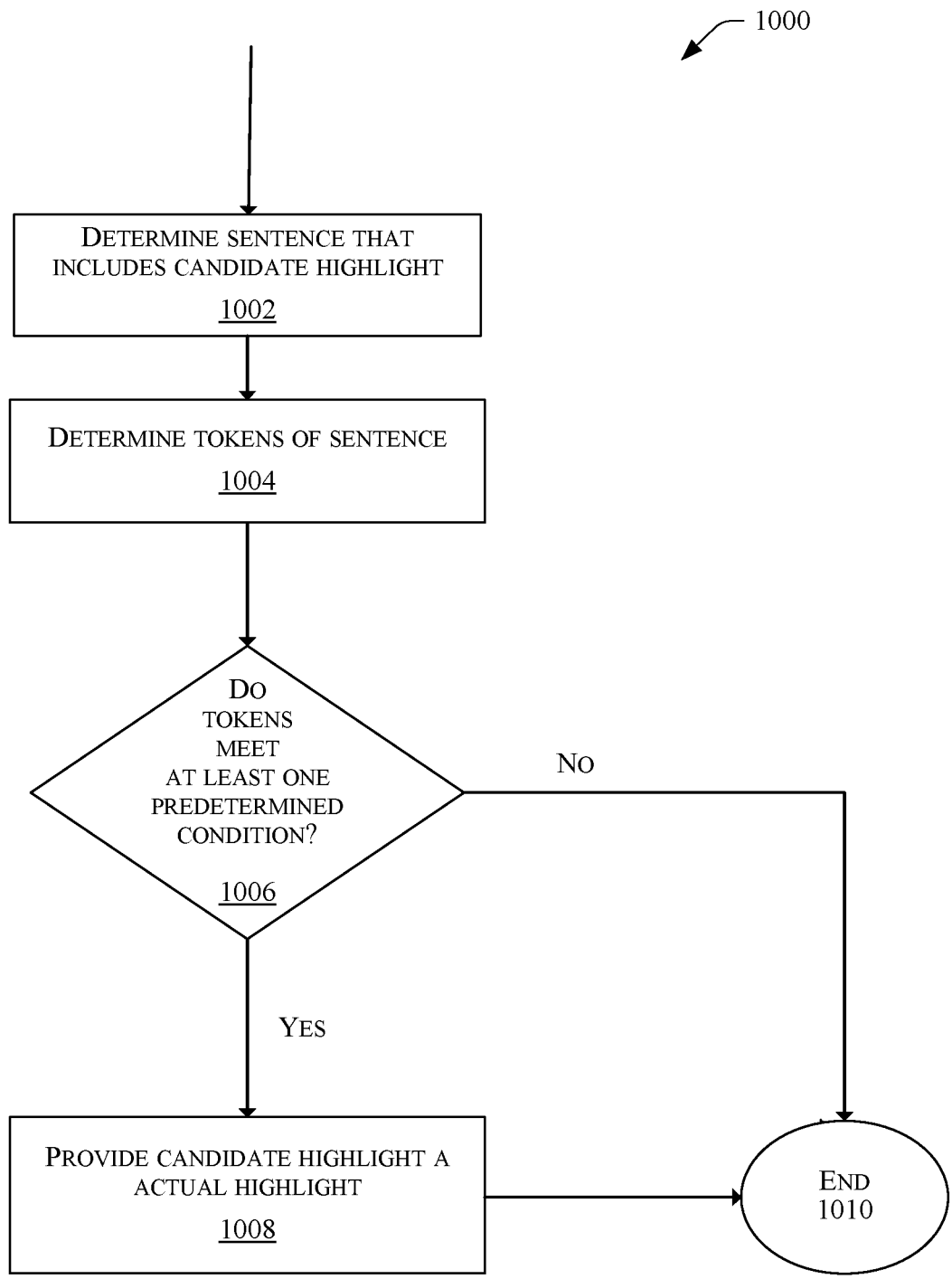
FIG. 10 is a flowchart illustrating a process that may be utilized to determine which candidate highlights of a conversation are to be provided as actual highlights, such as to be provided as part of a conversation summary.

FIG. 10 is a flowchart illustrating a process 1000 that may be utilized to determine which candidate highlights of a conversation are to be provided as actual highlights, such as to be provided as part of a conversation summary. The process 1000 is an example of a process that may be carried out by the candidate filter 112. At 1002, one or more processors determines a sentence in the conversation that includes the candidate highlight. At 1004, the one or more processors determine at least some tokens of the sentence surrounding the candidate highlight. For example, the one or more processors may determine up to three tokens prior to the candidate highlight in the sentence including the candidate highlight and up to three tokens after the candidate highlight in the sentence including the candidate highlight.

At 1006, the one or more processors determine if the tokens meet at least one predetermined condition. For example, the at least one predetermined condition may be do not meet certain conditions consistent with the candidate phrase corresponding to an actual conversation highlight. In some examples, the filtering rules are applied to an entire sentence including the candidate phrase or to only a portion of the sentence. Some example filtering techniques may eliminate a candidate phrase as an actual conversation highlight depending on whether parts of speech tags corresponding to the tokens meet at least one predetermined condition. In some example filtering techniques, other linguistic filtering rules may be applied.

If the at least one predetermined condition is met, the one or more processors provide the candidate highlight as an actual highlight at 1008. Otherwise, the candidate highlight is not provided as an actual highlight, and the process 1000 ends at 1010.

Figure 11:
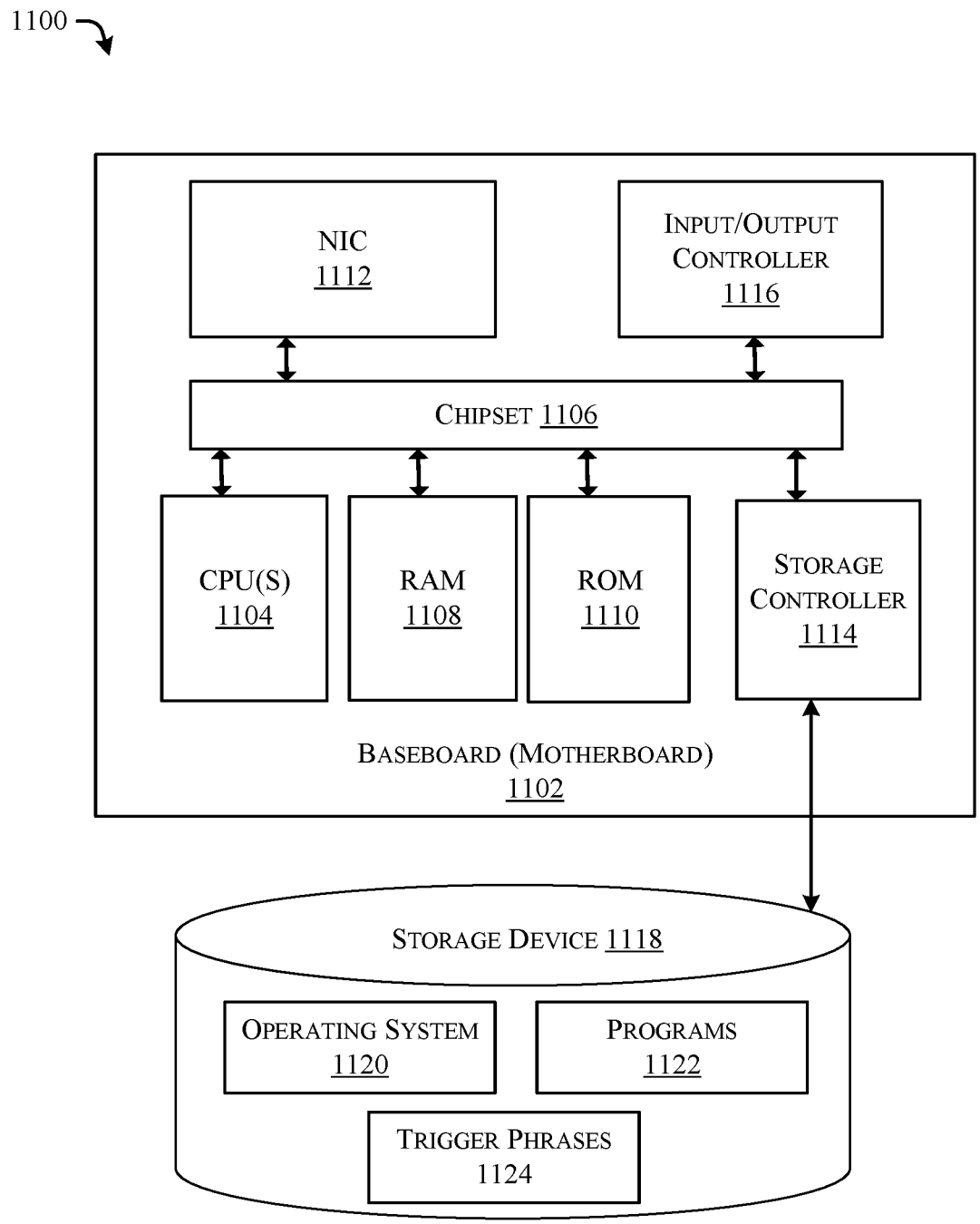
FIG. 11 illustrates an example computer architecture for a computer capable of executing program components for implementing the functionality described herein.

FIG. 11 illustrates an example computer architecture for a computer 1100 capable of executing program components for implementing the functionality described above. The computer architecture shown in FIG. 11 illustrates an architecture of a server computer, workstation, desktop computer, laptop, tablet, network appliance, e-reader, smartphone, network switch, or other computing device, and can be utilized to execute any of the software components presented herein. The computer 1100 may, in some examples, correspond to a network infrastructure device discussed herein.

The computer 1100 includes a baseboard 1102, or "motherboard," which may be a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be, for example, standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein. As illustrated in FIG. 11, the ROM 1110 or NVRAM can also store data usable by the computer 1100 to generate and/or process attestation information in messages exchanged among the computer 1100 and other devices. In other examples, this data may be stored elsewhere, such as in RAM 1108.

The computer 1100 can operate in a networked environment using logical connections to remote computing devices and computer systems through a network. For example, the chipset 1106 can include functionality for providing network connectivity through a Network Interface Controller (NIC) 1112, such as a gigabit Ethernet adapter. The NIC 1112 can connect the computer 1100 to other computing devices over a network. It should be appreciated that multiple NICs 1112 can be present in the computer 1100, connecting the computer to other types of networks and remote computer systems. In some instances, the NICs 1112 may include at least one ingress port and/or at least one egress port. An input/output controller 1116 may be provided for other types of input/output.

The computer 1100 can be connected to a storage device 1118 that provides non-volatile storage for the computer. The storage device 1118 can store an operating system 1120, programs 1122, and data 1124, for example. The storage device 1118 can be connected to the computer 1100 through a storage controller 1114 connected to the chipset 1106. The storage device 1118 can include one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The data 1124 may include, for example, a collection of trigger phrases against which statements may be matched.

The computer 1100 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like. For example, the computer 1100 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage device 1118 by detecting the physical states or characteristics of one or more particular locations within the physical storage units.

In addition to the storage device 1118 described above, the computer 1100 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 1100.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method of processing a conversation, comprising:
    communicating audio of an audio conference call for a conversation between multiple users;
    transcribing speech represented in the audio into text data;
    determining, using pre-learned phrases from previous audio conference calls, that a first sentence in the text data includes one or more words that are a highlight of the conversation, wherein the first sentence pertains to a topic;
    determining whether a second sentence in the conversation that is adjacent the first sentence in the text data, pertains to the topic, and is semantically related to the highlight;
    based at least in part on determining that the second sentence pertains to the topic and is semantically related to the highlight, generating a first highlight phrase associated with the highlight using the first sentence and the second sentence;
    based at least in part on determining that the second sentence pertains to a different topic or is semantically unrelated to the highlight, generating a second highlight phrase associated with the highlight using the first sentence; and
    outputting the first highlight phrase or the second highlight phrase to a first user of the multiple users.

2. The computer-implemented method of claim 1, further comprising:
    outputting the first highlight phrase to the first user of the multiple users; and
    determining, using at least the first sentence and the second sentence, an action item for the first user of the multiple users, the action item indicating an action to be performed by the first user as discussed in the conversation,
    wherein outputting the first highlight phrase comprises outputting the action item to the first user.

3. The computer-implemented method of claim 2, further comprising:
    determining, using the first sentence or the second sentence, that the first user from amongst the multiple users is to perform the action item;
    determining a timeframe in which the first user is to perform the action item; and
    outputting an indication of the timeframe to the first user.

4. The computer-implemented method of claim 1, further comprising:
    outputting the first highlight phrase to the first user of the multiple users; and
    determining, using at least the first sentence and the second sentence, a conversation summary for the conversation,
    wherein outputting the first highlight phrase comprises outputting the conversation summary to the first user.

5. The computer-implemented method of claim 1, further comprising:
    prior to outputting the first highlight phrase of the second highlight phrase to the first user, receiving input from a second user of the multiple users, the input including an edit for the first highlight phrase or the second highlight phrase to be output; and
    applying the edit prior to outputting the first highlight phrase or the second highlight phrase to the first user.

6. The computer-implemented method of claim 1, further comprising:
    assigning tokens to other sentences in the text data representing the conversation;
    determining, using the tokens, that the other sentences fail to meet conditions for being highlight phrases; and
    refraining from using the other sentences to generate a highlight phrase.

7. A system comprising:
one or more processors; and
one or more non-transitory computer-readable media storing computer-readable instructions that, when executed by the one or more processors, cause the one or more processors to perform operations comprising:
    communicating audio of an audio conference call for a conversation between multiple users;
    transcribing speech represented in the audio into text data;
    determining, using pre-learned phrases from previous audio conference calls, that a first sentence in the text data includes one or more words that are a highlight of the conversation, wherein the first sentence pertains to a topic;

determining whether a second sentence in the conversation that is adjacent the first sentence in the text data, pertains to the topic, and is semantically related to the highlight;

based at least in part on determining that the second sentence pertains to the topic and is semantically related to the highlight, generating a first highlight phrase associated with the highlight using the first sentence and the second sentence;

based at least in part on determining that the second sentence pertains to a different topic or is semantically unrelated to the highlight, generating a second highlight phrase associated with the highlight using the first sentence; and outputting the first highlight phrase or the second highlight phrase to a first user of the multiple users.

8. The system of claim 7, the operations further comprising:

outputting the first highlight phrase to the first user of the multiple users; and determining, using at least the first sentence and the second sentence, an action item for the first user of the multiple users, the action item indicating an action to be performed by the first user as discussed in the conversation, wherein outputting the first highlight phrase comprises outputting the action item to the first user.

9. The system of claim 8, the operations further comprising:

determining, using the first sentence or the second sentence, that the first user from amongst the multiple users is to perform the action item;

determining a timeframe in which the first user is to perform the action item; and outputting an indication of the timeframe to the first user.

10. The system of claim 7, the operations further comprising:

outputting the first highlight phrase to the first user of the multiple users; and determining, using at least the first sentence and the second sentence, a conversation summary for the conversation, wherein outputting the first highlight phrase comprises outputting the conversation summary to the first user.

11. The system of claim 7, the operations further comprising:

prior to outputting the first highlight phrase of the second highlight phrase to the first user, receiving input from a second user of the multiple users, the input including an edit for the first highlight phrase or the second highlight phrase to be output; and applying the edit prior to outputting the first highlight phrase or the second highlight phrase to the first user.

12. The system of claim 7, the operations further comprising:

assigning tokens to other sentences in the text data representing the conversation;

determining, using the tokens, that the other sentences fail to meet conditions for being highlight phrases; and refraining from using the other sentences to generate a highlight phrase.

13. One or more non-transitory computer-readable media storing computer-readable instructions that, when executed by one or more processors, cause the one or more processors to perform operations comprising:

communicating audio of an audio conference call for a conversation between multiple users;

transcribing speech represented in the audio into text data;

determining, using pre-learned phrases from previous audio conference calls, that a first sentence in the text data includes one or more words that are a highlight of the conversation, wherein the first sentence pertains to a topic;

determining whether a second sentence in the conversation that is adjacent the first sentence in the text data, pertains to the topic, and is semantically related to the highlight;

based at least in part on determining that the second sentence pertains to the topic and is semantically related to the highlight, generating a first highlight phrase associated with the highlight using the first sentence and the second sentence;

based at least in part on determining that the second sentence pertains to a different topic or is semantically unrelated to the highlight, generating a second highlight phrase associated with the highlight using the first sentence; and outputting the first highlight phrase or the second highlight phrase to a first user of the multiple users.

14. The one or more non-transitory computer-readable media of claim 13, the operations further comprising:

outputting the first highlight phrase to the first user of the multiple users; and determining, using at least the first sentence and the second sentence, an action item for the first user of the multiple users, the action item indicating an action to be performed by the first user as discussed in the conversation, wherein outputting the first highlight phrase comprises outputting the action item to the first user.

15. The one or more non-transitory computer-readable media of claim 14, the operations further comprising:

determining, using the first sentence or the second sentence, that the first user from amongst the multiple users is to perform the action item;

determining a timeframe in which the first user is to perform the action item; and outputting an indication of the timeframe to the first user.

16. The one or more non-transitory computer-readable media of claim 13, the operations further comprising:

outputting the first highlight phrase to the first user of the multiple users; and determining, using at least the first sentence and the second sentence, a conversation summary for the conversation, wherein outputting the first highlight phrase comprises outputting the conversation summary to the first user.

17. The one or more non-transitory computer-readable media of claim 13, the operations further comprising:

prior to outputting the first highlight phrase of the second highlight phrase to the first user, receiving input from a second user of the multiple users, the input including an edit for the first highlight phrase or the second highlight phrase to be output; and applying the edit prior to outputting the first highlight phrase or the second highlight phrase to the first user.

18. The one or more non-transitory computer-readable media of claim 13, the operations further comprising:

assigning tokens to other sentences in the text data representing the conversation;

determining, using the tokens, that the other sentences fail to meet conditions for being highlight phrases; and refraining from using the other sentences to generate a highlight phrase.

19. The one or more non-transitory computer-readable media of claim 13, the operations further comprising:
   lemmatizing one or more words in the first sentence to generate one or more lemmatized words; and
   matching the one or more lemmatized words to one of the pre-learned phrases.

20. The one or more non-transitory computer-readable media of claim 13, wherein outputting the first highlight phrase or the second highlight phrase includes sending, to a display device, an option for the first user to edit or discard the output.

\* \* \* \* \*